United States Patent
Breuer et al.

(10) Patent No.: US 12,008,996 B2
(45) Date of Patent: Jun. 11, 2024

(54) SYSTEM AND METHOD FOR MANAGING AN AUTOMATED VOICEMAIL

(71) Applicant: Microsoft Technology Licensing, LLC, Redmond, WA (US)

(72) Inventors: Richard Breuer, Alsdorf (DE); Thomas Moser, Kufstein (AT); Christoph Gilles, Herzogenrath (DE); Hans Haustetter, Lontzen (BE)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/717,326

(22) Filed: Apr. 11, 2022

(65) Prior Publication Data

US 2022/0238114 A1    Jul. 28, 2022

Related U.S. Application Data

(63) Continuation of application No. 16/529,369, filed on Aug. 1, 2019, now Pat. No. 11,302,335.

(51) Int. Cl.
| | |
|---|---|
| G10L 17/00 | (2013.01) |
| G10L 17/24 | (2013.01) |
| G10L 17/26 | (2013.01) |
| H04M 1/27 | (2006.01) |
| H04M 3/533 | (2006.01) |

(52) U.S. Cl.
CPC .............. G10L 17/00 (2013.01); G10L 17/24 (2013.01); G10L 17/26 (2013.01); H04M 1/271 (2013.01); H04M 3/533 (2013.01); H04M 2203/6027 (2013.01); H04M 2250/74 (2013.01)

(58) Field of Classification Search
None
See application file for complete search history.

(56) References Cited

U.S. PATENT DOCUMENTS

| | | | | |
|---|---|---|---|---|
| 6,181,780 | B1 * | 1/2001 | Finnigan | G10L 17/00 |
| | | | | 379/88.04 |
| 7,657,005 | B2 * | 2/2010 | Chang | H04M 3/5183 |
| | | | | 704/270.1 |
| 8,116,436 | B2 * | 2/2012 | Isenberg | H04M 3/42042 |
| | | | | 379/88.19 |
| 8,150,000 | B2 * | 4/2012 | Gao | H04M 3/537 |
| | | | | 379/88.19 |
| 8,234,494 | B1 * | 7/2012 | Bansal | G10L 15/02 |
| | | | | 713/176 |
| 8,391,445 | B2 * | 3/2013 | Hoblit | H04M 1/57 |
| | | | | 709/228 |

(Continued)

*Primary Examiner* — Douglas Godbold
(74) *Attorney, Agent, or Firm* — Foley IP Law, PLLC (57) ABSTRACT

A system, method and computer-readable storage device are disclosed signing a voicemail and confirming an identity of the speaker. A method includes receiving a request to verify a speaker associated with a communication to a recipient, receiving first data from the speaker in connection with the communication, accessing second data associated with the speaker to verify the speaker, determining whether a match exists between the first data and the second data to yield a determination, retrieving a communication address of the recipient, generating a notification for the recipient, wherein the notification reports on the determination and transmitting the notification to the recipient at the communication address.

18 Claims, 6 Drawing Sheets

(56) References Cited

U.S. PATENT DOCUMENTS

| | | | | |
|---|---|---|---|---|
| 8,606,579 | B2* | 12/2013 | Rasmussen | G10L 17/06 |
| | | | | 704/246 |
| 8,751,233 | B2* | 6/2014 | Bansal | G10L 17/24 |
| | | | | 713/168 |
| 10,762,899 | B2* | 9/2020 | Cho | G10L 15/22 |
| 2003/0135740 | A1* | 7/2003 | Talmor | H04L 9/3231 |
| | | | | 713/186 |
| 2004/0156510 | A1* | 8/2004 | Isaka | G10K 11/175 |
| | | | | 381/59 |
| 2007/0233483 | A1* | 10/2007 | Kuppuswamy | G10L 17/20 |
| | | | | 704/247 |
| 2008/0062938 | A1* | 3/2008 | Gil-soo | H04W 4/12 |
| | | | | 370/338 |
| 2010/0131272 | A1* | 5/2010 | Wu | H04L 9/3231 |
| | | | | 704/250 |
| 2010/0150324 | A1* | 6/2010 | Albert | H04M 3/53366 |
| | | | | 379/88.22 |
| 2011/0141106 | A1* | 6/2011 | Runge | G06V 10/811 |
| | | | | 382/118 |
| 2012/0020577 | A1* | 1/2012 | Yasrebi | G10L 21/12 |
| | | | | 382/229 |
| 2013/0138967 | A1* | 5/2013 | Auld | G06V 40/172 |
| | | | | 713/180 |
| 2015/0003599 | A1* | 1/2015 | Brunn | G06F 16/951 |
| | | | | 379/142.04 |
| 2017/0169822 | A1* | 6/2017 | Fujita | G10L 15/19 |
| 2018/0089407 | A1* | 3/2018 | Watson | G06F 21/32 |
| 2018/0205823 | A1* | 7/2018 | Horton | G10L 17/04 |
| 2020/0162610 | A1* | 5/2020 | VanBlon | H04M 3/436 |

* cited by examiner

THE IDEA

- THE IDEA IS TO SIGN A VOICE MESSAGE WITH A VOICE PRINT
- BY DOING SO, THE RECIPIENT CAN BE NOTIFIED, THAT THIS MESSAGE CAN BE TRUSTED TO BE SPOKEN BY THE CLAIMED SENDER
- ANALOGY: SIGNING A TEXT MESSAGE WITH A PRIVATE RSA KEY

MESSAGE TRANSCRIPTION — SAFE

502 — HI THIS IS MARK CALLING FROM VACATION. I AM REALLY HAVING A GREAT TIME HERE AND LOOK FORWARD TO GETTING BACK IN ABOUT SIX WEEKS OR SO

| | |
|---|---|
| FINAL DECISION | MATCH |
| DECISION REASON | VOICEPRINTMATCH |
| NETAUDIO | 7.56 |
| SNR | 38.7886353 |
| SPEECH LEVEL | 5.54465055 |
| SATURATION LEVEL | 0 |
| GENDER SCORE | 79.91362 |
| BIOMETRIC SCORE | 4.021821 |

MESSAGE TRANSCRIPTION — UNSAFE

TH MULLER. THIS IS YOUR CEO SPEAKING. I AM BUYING A SMALL COMPANY. THIS IS TOP SECRET. DON'T TELL ANYONE! NOW, I NEED YOU TO IMMEDIATELY TRANSFER 1 MILLION US DOLLARS TO BARCLAYS CAYMAN ISLANDS, ACCOUNT NUMBER 2304 9876. EVERY SECOND COUNTS, MULLER. I WANT THIS TRANSFER TO BE COMPLETED IN 5 MINUTES!

| | |
|---|---|
| FINAL DECISION | MISMATCH |
| DECISION REASON | VOICEPRINTMISMATCH |
| NETAUDIO | 32.27 |
| SNR | 18.60376 |
| SPEECH LEVEL | 4.777274 |
| SATURATION LEVEL | 0 |
| GENDERS CORE | 56.422657 |
| BIOMETRIC SCORE | 4.32775354 |

SYSTEM AND METHOD FOR MANAGING AN AUTOMATED VOICEMAIL

PRIORITY INFORMATION

The present application is a continuation of U.S. patent application Ser. No. 16/529,369, filed Aug. 1, 2019, the contents of which is incorporated herein in its entirety.

BACKGROUND

1. Technical Field

The present disclosure relates to managing voicemail messages and more specifically to providing an extension or additional component in a voicemail system in which a speaker of the voicemail message is tested or verified to confirm the identity of that speaker. A notification is provided to the recipient of the message reporting on whether the identity of the speaker is confirmed or not.

2. Introduction

One area of fraud that is becoming more frequent involves fraudsters leaving voicemail messages pretending to be someone else. A scammer may call from a spoofed phone number and leave a voicemail. The scammer often asks the recipient of the message to transfer money to a bank account. The scammer may be able to control their voice to sound like a friend, boss or relative. The called party may not realize that this is an attempted deception. Much money has already been lost by this scam.

DESCRIPTION

The present disclosure addresses the deficiencies in present systems which do not provide any confirmation to a recipient of a communication that the speaker or person who initiated the communication is identified properly and can be trusted. The concepts disclosed herein can apply to any communication, whether audio only, video, text, livestream, or any other medium of communication in which the person generating or initiating the communication can provide some data which can be used to verify the person. Generally speaking, the system disclosed herein involves a component incorporated into a voicemail or other system that will use a voiceprint or other data associated with the speaker to confirm the identity of the speaker and generate a notification such as an email to the recipient.

The disclosure also includes other aspects that are generally related to the concept described above. For example, the system can also use images, movement, textual patterns, facial recognition, fingerprint recognition, video, or any other biometric or other data to verify that a person who is generating a communication for a recipient can be confirmed and a notification can be provided to the recipient about the decision or confidence level of the identity of the person generating the communication.

BRIEF INTRODUCTION

Methods and systems are disclosed for addressing the problem outlined above. The example provided will relate to voicemails or voice messages but can be expanded to cover video, textual, gestures, multimodal input, or other modalities of communication.

The solution with respect to voicemails or audio communication involves users registering for a verification service in which users provide a voiceprint which is the used to confirm the user's identity. Once a voiceprint is registered, the service operates when an enrolled individual cannot reach a called party by phone. The enrolled person typically will leave a voicemail. In this scenario, rather than just receiving the voicemail or enabling the called party to access the voicemail, the called party will receive a notification such as an email. The email will confirm that the voicemail is from the real sender or, in the event of potential fraud, the email can include a warning that can indicate that the person who left the voicemail may not be legitimate. The email can include a transcription so that the recipient can read the message even if the called party cannot listen to the voicemail because he or she is in a meeting. With a warning about the identity of the caller, the recipient can avoid being scammed and can take further action. For example, where there is a mismatch, the notification can include an object that the recipient can interact with, such as a link, to report the likely scam to authorities. The object might include data about the speaker which can be used to take additional action or which can be used to prevent further scamming.

The solution includes the combination of accessing a storage of voiceprints in connection with a call and the saved message as well as accessing the called party's email address and constructing an email or other type of communication which reports on the analysis of the voice of the individual who left a voicemail.

A method can include receiving a request to verify a speaker associated with a communication to a recipient, receiving first data from the speaker in connection with the communication, accessing second data associated with the speaker to verify the speaker, determining whether a match exists between the first data and the second data to yield a determination, retrieving a communication address of the recipient, generating a notification for the recipient, wherein the notification reports on the determination and transmitting the notification to the recipient at the communication address.

The approach can apply beyond voicemails as well. It can apply to live audio communications, video streams, livestreams, texts, multimodal communications, gestures, or any other communication where a biometric print or data associated with a speaker or first individual can be compared with speech, video, or any other data associated with the first individual as they participate in a communication intended for a second individual. As the communication is provided to the second individual, data is presented to the second individual which confirms a match or the identity of the first individual such that the second individual can trust the communication.

DETAILED DESCRIPTION

Various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1, which can be employed to practice the concepts, methods, and techniques disclosed, is illustrated. A more detailed description of specific embodiments will then follow. These variations shall be described herein as the various embodiments are set forth. The disclosure now turns to FIG. 1.

Figure 1:
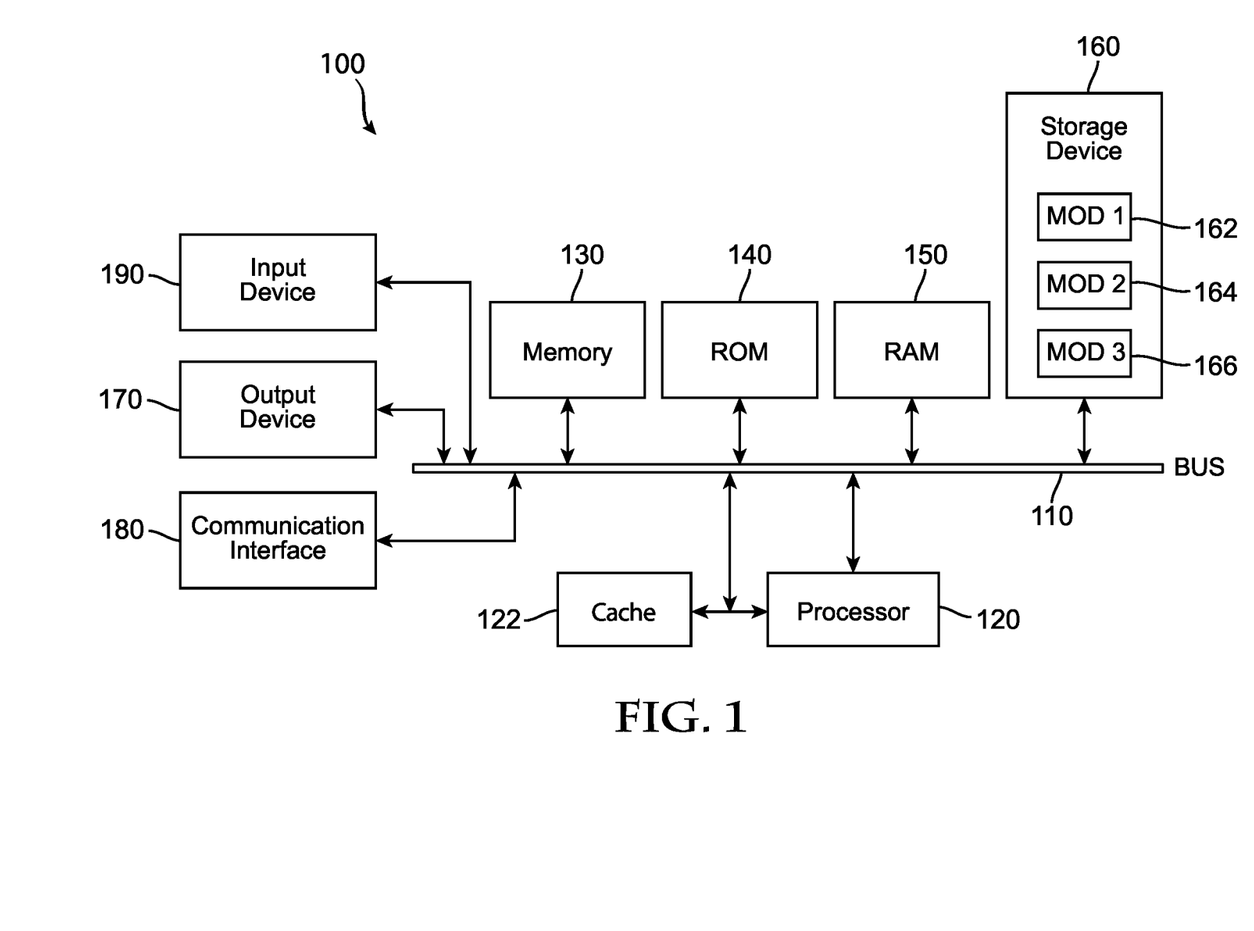
FIG. 1 illustrates an example system embodiment.

With reference to FIG. 1, an exemplary system and/or computing device 100 includes a processing unit (CPU or processor) 120 and a system bus 110 that couples various system components including the system memory 130, such as read only memory (ROM) 140 and random access memory (RAM) 150, to the processor 120. The system 100 can include a cache 122 of high speed memory connected directly with in close proximity to, or integrated as part of, the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. Notably, a special-purpose computer is disclosed in which the algorithms or steps disclosed herein are combined with the computer components described herein to generate the special purpose computer.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out a particular function. In another aspect, the system can use a processor and computer-readable storage medium to store instructions which, when executed by the processor, cause the processor to perform a method or other specific actions. The basic components and appropriate variations can be modified depending on the type of device, such as whether the device 100 is a small, handheld computing device, a desktop computer, or a computer server.

Although the exemplary embodiment(s) described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations. The system component of FIG. 1 can include a mute management module, which can be any of the modules 162, 164, 166 and which can operate as a local mobile or desktop device that the user holds or speaks into and/or can be a module configured on a network-based server, which can perform the specific functions disclosed herein. Furthermore, a load-balancing or sharing of the performance of specific steps can also occur in part on a local mobile device or desktop device, and a network-based server.

Figure 2:
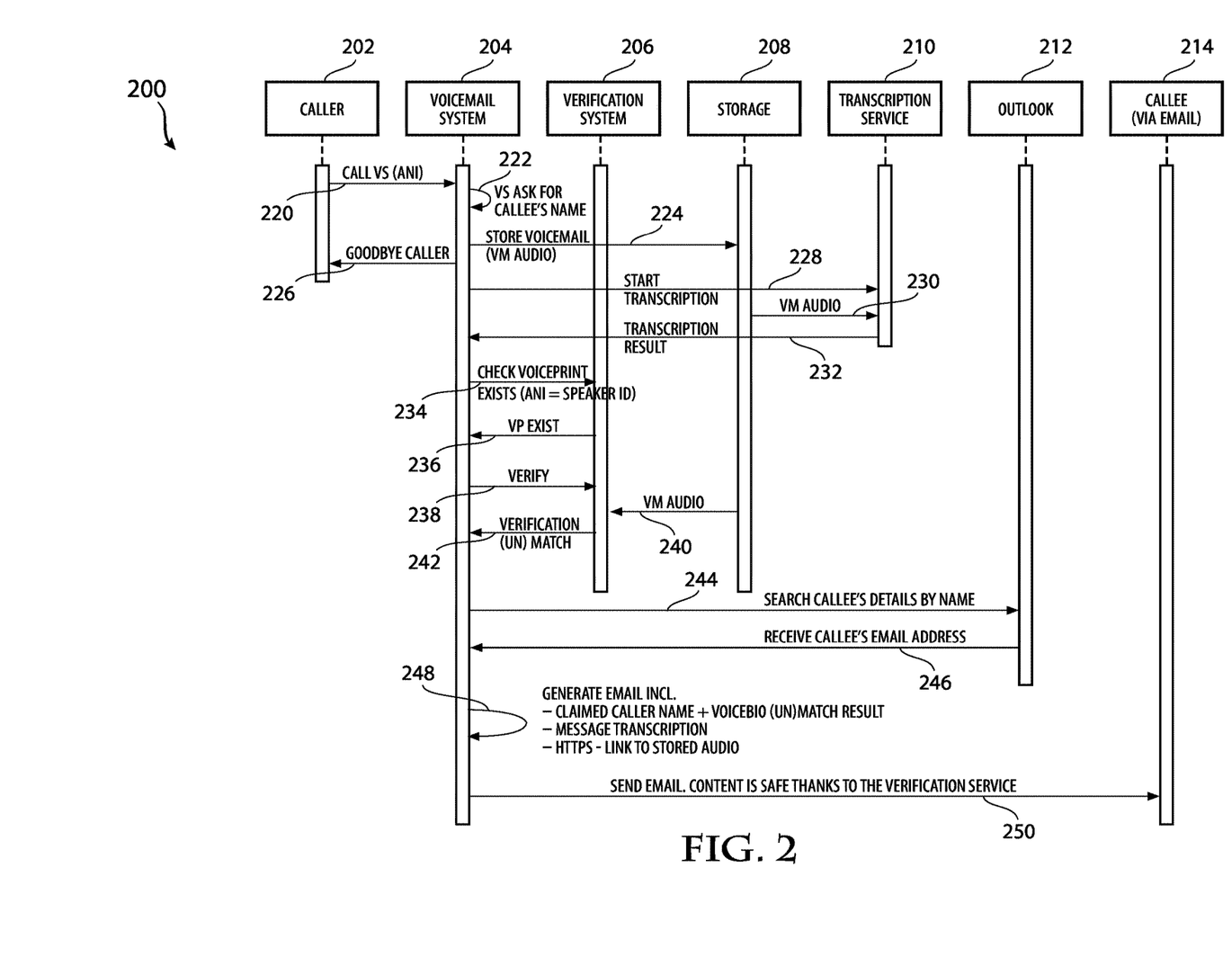
FIG. 2 illustrates basic flow for a verification according to an embodiment.

Having disclosed some components of a computing system that are used to create the special-purpose computer disclosed herein, the disclosure turns to FIG. 2, which illustrates the basic components 200 of the system. As shown in FIG. 2, the various components or participants in the process can include a caller 202, a voicemail system 204, a verification system 206, a storage unit 208, a transcription service 210, an email service 212 and the called party 214. Where other modalities like livestreaming or video conference, the email service 212 can represent a service or component that provides the necessary recipient identification data to generate and provide the notification about the identity of the person initiating the communication.

An example procedure can include the following steps or operations. The caller can first use an enrollment component in which the caller calls the verification system 220. In one scenario, the user enrolls in the system and provides voice data which can then be used by the verification system 220 to verify the user's identity when they later leave voicemail messages. The verification system 220 may ask for data associated with the caller such as a caller's name or it may present a script or other instructions for the caller to talk, or move, or type, or perform a gesture as part of the enrollment process.

The verification system 220 can enroll the user in the verification system 220 in a number of different ways. One example mechanism is a user initially providing data to the verification system 220 in advance of leaving messages or other types of communications. The user could request via a user interface to enroll in the verification system 220. A voiceprint is mentioned above but the "Xprint" can be any type of user data which can later be used to verify a person who is providing a communication to a recipient. The data can be a videoprint, a textprint, a gestureprint, an imageprint, a facialmotionprint, and so forth. Each of these "prints" can include data which is personal to the individual and which can be used to verify the identity of the individual. For example, a facial image can be used later identify the individual, a fingerprint can be used, the speed and manner in which the user types on a keyboard can indicate how a particular user types. In other examples, characteristics associated with how users construct text messages or emails may be used, facial features or movement as they speak and/or gestures that the user may produce as they input a communication into a system can provide data about individual user characteristics. Thus, this disclosure applies beyond simply receiving voice data which can be used to generate a voiceprint for confirming the user's identity.

When the user then leaves a voicemail message, the system can store the voicemail 224 in a database 208. If the caller, which can be identified via an automatic number identification (ANI) approach or other technology, does not have a voiceprint or other type of print yet, the user needs to be enrolled. To enroll a person who has not previously enrolled it can be dynamically enrolled. An email can be sent to the caller asking for identity confirmation. The system will receive a voicemail and check to determine whether the underlying data for confirming the identity of the caller is available. If not, then the system can remedy the data deficiency by communicating with the caller to request data. In one aspect, the user leaves a voicemail message which can be used for voiceprint creation. The system will evaluate the voicemail message to determine if there is sufficient data for creating a voiceprint. If registration can also occur via the voicemail message, the system may send a communication (like an email) to the speaker which can indicate that a caller left a message with the verification system but that their voiceprint is not yet in the system. The email can request or note that if they left the message transcribed within the email, to please click on the confirmation link so that the system can create a voiceprint for the caller. Again, the voicemail may be long enough or sufficient enough to create the voiceprint and the user may only need to click on the confirmation link that they left a message. Where the voicemail does not have sufficient data to create a voiceprint, the email may include a link to initiate components such as a microphone on the device used by the user to speak an additional utterance which can be used to create the voiceprint. Furthermore, if the system does enable other types of prints as set forth above, then when the user leaves a voicemail, the system can also communicate in any manner with the user to provide one or more of video, additional audio, text, gestures, and so forth. Leaving a voicemail with the system can trigger the ability of the system to establish a number of different types of prints which can be used to confirm the identity of the user in various modalities. Of course verification system could also combine modalities and the verification process as well. For example, the system could combine an evaluation of the user speech in connection with a video of the user speaking or sensor data regarding gestures made by the user or facial movement patterns and so forth. Location data can also be applicable to the analysis or evaluation of the identify of a user or as part of the enrollment process for a user.

This process can enable an easy confirmation via the communication sent to the proper or expected person. In other words, the person that left the voicemail message can confirm that they are the identified individual, which is the individual with access to the email account. Of course, any communication can be provided whether in an email, a text, a social media communication, a multimedia message, and so forth. The caller may also register separately or in advance with the voicemail verification system. If the voicemail is too short to create a voiceprint, the system may utilize a second voicemail which is longer to create a voiceprint within the voicemail system 204. Once the voicemail is stored in the storage location 208, the caller may then make calls 226. The voicemail system 204 can also start a transcription 228 of the voicemail (or video as well) using a transcription service 210. The voicemail audio 230 can or may be provided to the transcription service 210 for it to perform its task. The transcription is received 232 from the transcription service 210 at the voicemail system 204. Next, the voicemail system 204 checks to see of a voiceprint exists 234 with the verification system 206. The verification system 206 can return data about whether the voiceprint exists 236. The voicemail system 238 can verify or request verification of the identity of the person leaving the voicemail with the verification system 206. The verification system 206 can receive the voicemail audio 240 from the storage location 208 or the transcription service 210. A verification result of a match or an unmatch 242 can be provided from verification system to the voicemail system 204. The verification result might also be provided as a percentage of confidence or a probability value.

When the caller is not enrolled with the verification system, an email or other communication can be generated for the caller which can include a link to a verification system enrollment page which can include a hash generated from the automatic number identification data plus the voicemail transcription.

The aspect described above primarily focuses on analyzing the voicemail and comparing it to a voiceprint of the caller. However, in another aspect, the verification system 206 can also receive other data associated with the caller or in a more general sense the person initiating a communication with the recipient. Verification system 206 might have access to the sensor data which provides movement data for the person initiating the communication. Verification system 206 might include video data of the person or location data of the person. The system can combine one or more different modalities depending on the capabilities of the device that the person initiating the communication is using or other devices which can provide such data. Thus, the verification system 206 might receive the initiation of a communication from a person and evaluate the type of data associated with that person that is available to receive and analyze in view of confirming or seeking to see if there is a match in a database of prints in connection with that user.

Once the system receives the communications such as a voicemail, the system needs to evaluate or confirm the identity of the person leaving the communication and identify a communication address associated with the recipient. In the voicemail context, the system can search for the called party details by name 244 in an email system 212. The email system 212 can return the called party's email address 246 and the voicemail system 204 can generate an email that includes the caller's name and voice biometric match or unmatch result, a message transcription, and a link to stored audio to enable the user to be able to listen to the voicemail directly. This notification enables the called party to have confidence or a confirmation of the identity of the caller. This approach can warn the called party of a potential scam if the match effort fails.

Where different modes of communication are available, the system 204 can identify the data associated with the recipient in order to generate a communication according to the particular modality. For example, a phone number may be retrieved to send a text message associated with the communication. An IP address may be obtained for a particular computing device of the recipient such that a communication can be generated and transmitted to that IP address. Thus, generally speaking, the system 204 can identify data to be able to communicate with the recipient and will generate a communication that is sent to the recipient. The communication will include information about the match or unmatch result associated with the person that initiated the communication.

Figure 3:
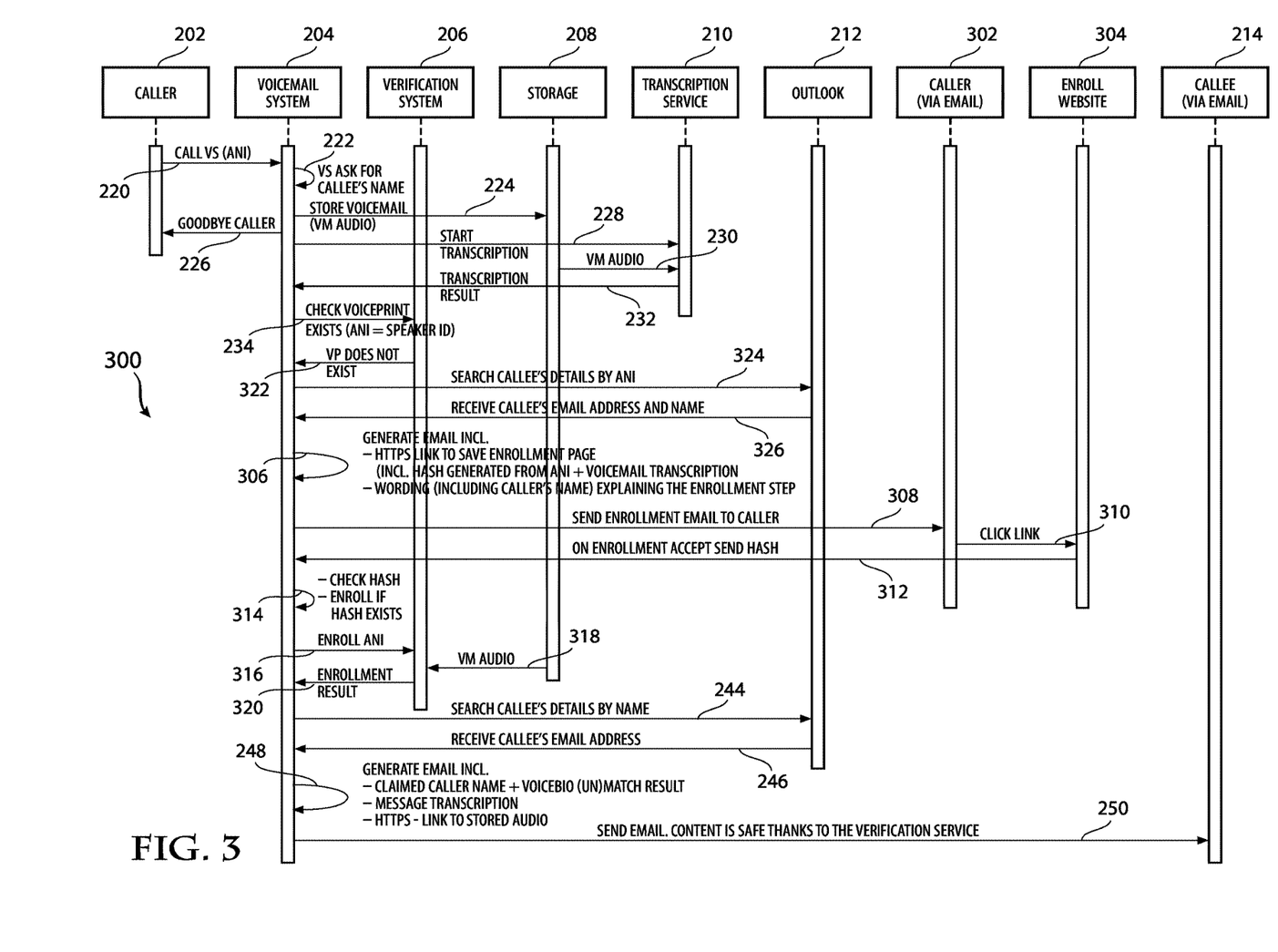
FIG. 3 illustrates basic flow for an enrollment according to an embodiment.

FIG. 3 illustrates the enrollment process with a caller's email 302 and an enrollment website 304. Step 306 describes the generated email to the caller and step 308 references the operation of sending an enrollment email to the caller and the caller clicking on a link 310 to the enrollment site 304. Once the user enrolls, an enrollment acceptance occurs and a hash can be sent 312 back to the voicemail system 204. The voicemail system 204 can check the hash and enroll the user if the hash exists 314. The system 204 can enroll the ANI 316 in the verification system 206 and the voicemail audio 318 can be received from storage. Verification system 206 can generate an enrollment result 320 which can be provided to the voicemail system 204.

In step 322, the system can check if a voiceprint exists in the verification system 206. The system can search the email system and search for the callee's details by ANI 324 and can receive the callee's email address, name and/or other data. All remaining steps are similar to what is outlined in FIG. 2. The examples provided in FIGS. 2 and 3 focus on voicemail and voiceprints but similar processes can also be applied to livestreaming data, video, texts, emails, or any other communication modality.

Figure 4:
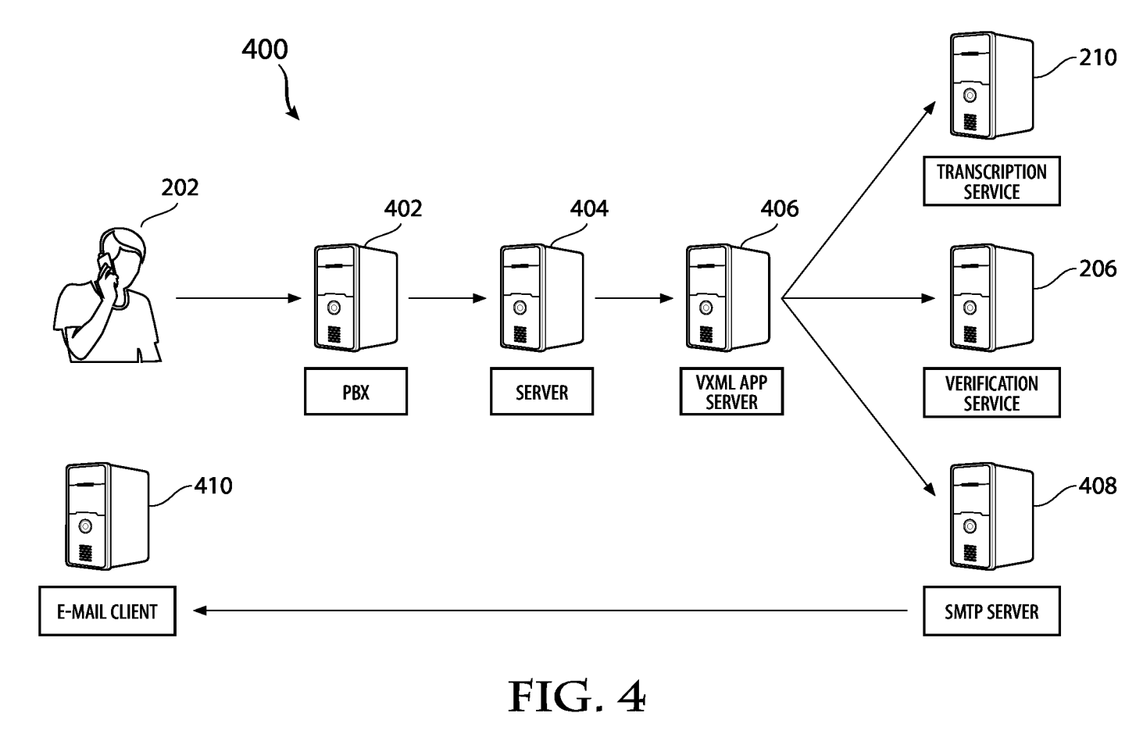
FIG. 4 illustrates components of the embodiment.

FIG. 4 illustrates some of architecture for the proposed system 400. Some of the numbering will be consistent with components introduced in FIG. 2. A caller 202 can call a system 402 which can act as a private branch exchange using any kind of protocol which can enable the communication or forwarding of the call to a server 404. The server 404 can provide speech processing for the call. The server 404 can interact with the component 402 and an VXML (voice extensible markup language) application 406. The server can perform the function of making the caller's voicemail audio available to the VXML application 406.

The VXML application 406 can map the caller's ANI to an email address associated with the caller and store the voicemail audio at an identifiable or dedicated location. A script programmed in a language such as Python can poll the memory location and send the audio data to a transcription service 210 for transcription. A transcription service 206 can receive the audio data from the VXML application 406 and can return back the transcribed result. A verification service 206 can be used to enroll or to verify the caller. A component can also be used to determine the language of the voicemail message.

An SMTP (simple mail transfer protocol) server 408 can be used by a script on the application server to send out the email to either the person who wants to enroll or to the intended recipient of the voicemail.

Figure 5:
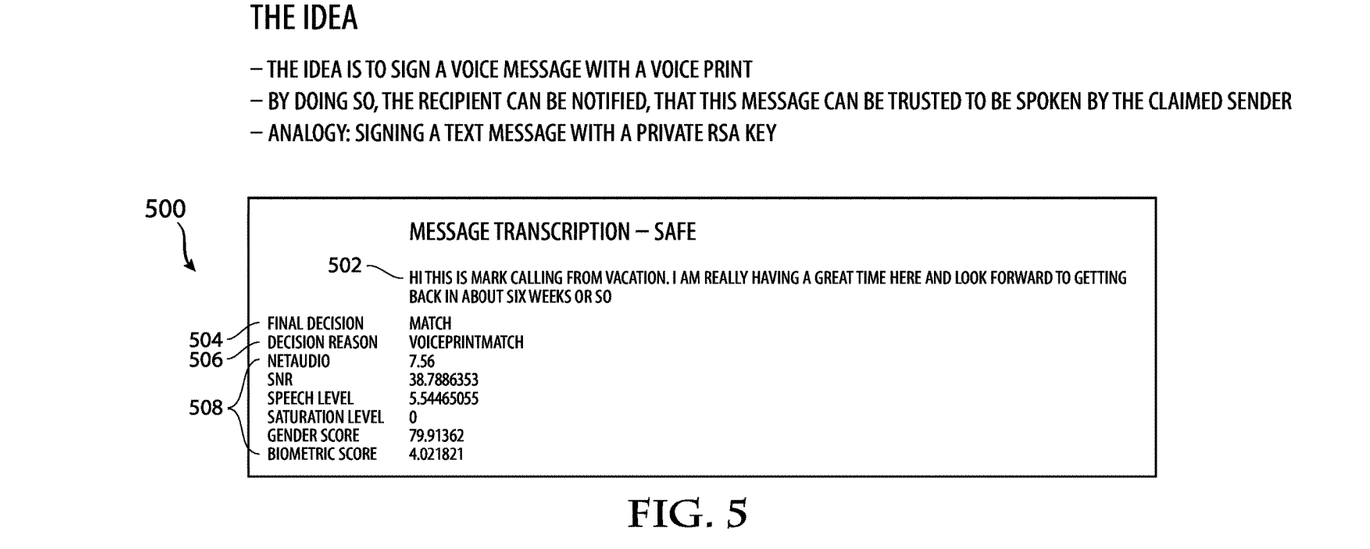
FIG. 5 illustrates a message transcription for a "match"

FIG. 5 illustrates an example message which can be sent to a called party. Message 500 can include data such as the message itself 502, a final decision regarding a match 504, a decision reason 506 and/or other data 508 such as one or more of a netAudio score, the signal-to-noise ratio, a speech level, a saturation level, a gender score, and a biometric score. An analysis can be performed to generate each of these different types of data in the notification. Other data can be included as well. The message can include a title which references that the message is "safe" in that the final decision is that there is a match with the voiceprint and that the message can be trusted.

In other modalities, the message may indicate that the communication from the person initiating the communication is confirmed via facial print, a video print, a gesture print, or combination of modalities and the resulting match exists at or above a threshold for confirming the identity of the individual. More detailed data might be provided without identifying a specific match but providing a probability value to the recipient regarding the identity of the person initiating a communication.

Figure 6:
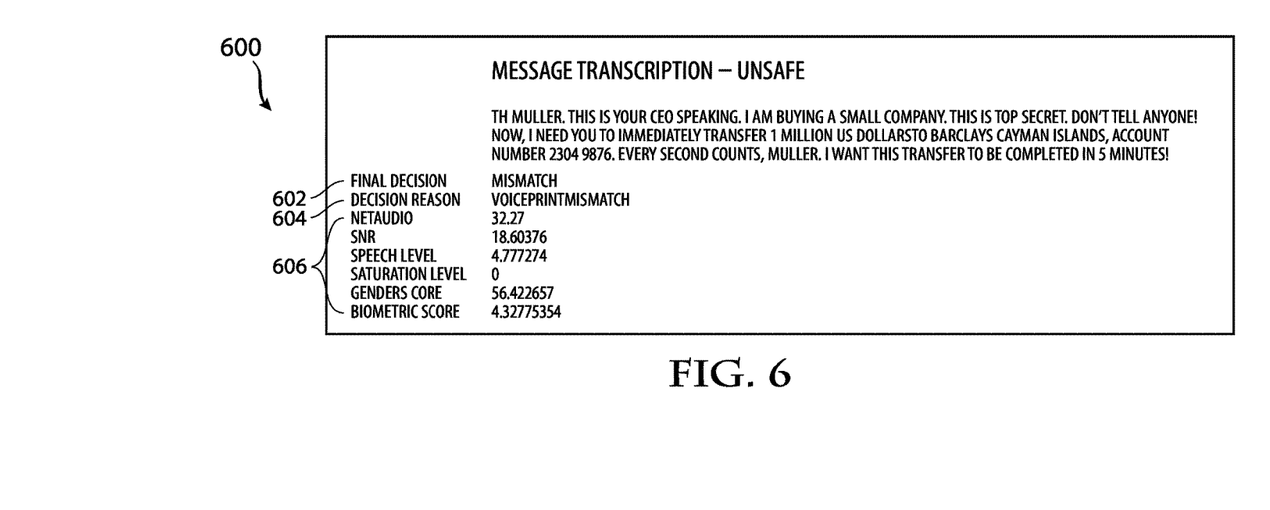
FIG. 6 illustrates a message transcription for a "mismatch"

FIG. 6 illustrates a message 600 indicating that the voicemail is "unsafe" in which the final decision 602 is a mismatch. The decision reason 604 is that there is a voiceprint mismatch. Other data 606 as described above can also be provided. Of course these messages could also be transmitted to the called party in other modalities such as audibly, as a background audio to the voicemail as the called party listens to the message or as background audio to a livestream video conference. Haptic notices could also be provided in which a mobile device is shaken to warn the user that the person providing the message or the person in the communication is untrusted. A notice of a lack of a match can include links or object that a user can interact with which initiate certain tasks, such as notifying a proper authority of a potential scam, blocking further communication from the person initiating the communication, sending a response back to the person, and so forth.

Possible enhancements to the above-described structure can include the following. The voicemail system can be enhanced such that any time a called person is not reachable, the calls can be forwarded to the verification system similar to a regular VM2T (voicemail to text) scenario. In one scenario, the ANI and the called party identifier obtained from a dialed number identification service (DNIS) can be provided to the verification service 206 so that an enrollment question for the caller can be avoided as that individual can be identified from the DNIS. In this scenario, the caller can still be identified from the original ANI and the verification service 206 can perform its analysis and then seek to "sign" the voicemail with the caller's voice print. For example, the system may sign a communication in a similar way to signing a text message with a private RSA (Reviest-Shamir-Adleman) key.

In one scenario, a suppressed ANI can complicate the process with the verification system 206. For the verification as well as for the enrollment case, an additional question asking for the caller's name can precede seeking the callee's name or contact information. Under the assumption that the ANI, name and email address are in the directory, the verification system 206 can recognize the name and map it to an ANI and thus the voiceprint. In another scenario, there might be more than one ANI per person. In this case, users can switch between their office phone, a fixed phone number, or private mobile phone number and still can be identified as the same person. The system can take this into account. One way to apply this concept is to attach several voiceprints to an ANI and then run a group verification. The system would verify the incoming audio against all voiceprints in the group. The voiceprints could also be attached to several ANIs, such as one for an office phone, another ANI for a home phone and yet another ANI for a cell phone. They could also be grouped, such as one ANI for a home phone and cell phone and a second ANI for an office phone.

The system can implement multiple channels through which to send the signed voicemail transcriptions. For example, in a short messaging service (SMS) texting approach, any messenger application such as WhatsApp, Facebook Messenger, or WeChat can be used. Any push notification on any smart phone can be used as well. Users can identify preferred channels or a hierarchy of channels to use for sending communications for receiving match/unmatch notifications.

In one example, the confirmation email is sent through the verification system 206. However, an alternate approach would be to integrate the service into an email application such as Outlook™ which will allow the system to send an email from the caller's account. In this case, the recipient can directly respond to the email containing the voicemail transcription. In other words, the system generates the notification email and sends it to the recipient as through the speaker had sent the email. The recipient can then hit "reply" to that email and send a response directly back to the speaker (although the speaker did not manually create the notification email). This approach can enhance or improve the ability of the recipient or called party to easily both receive an email with a transcription or link to the voicemail message as well as to initiate a different form of communication (an email) from the original communication (a voicemail). In other words, by integrating these processes into an email application, and by automatically generating an email from the caller email address, the called party can easily respond to the calling party via email. Generally speaking, a first communication modality can be used which will have a notification sent in a different modality. Current voicemail notification systems are sent from a voicemail system email address and not from the email address of the calling party. Thus, an individual receiving a notification of the voicemail via email, either has to initiate a new email to the calling party or telephone the calling party in order to respond. In another aspect, a link could be provided to the email which could initiate a Skype communications, a FaceTime communications or telephone call to the calling party in order to enable a one click or simplified initiation of a communication from the called party to the calling party.

Other authentication features can be integrated into the verification system 206. For example, some authentication features require some textual input in connection with a voice message for authentication. In this scenario, the process might include the user providing some text such as an answer to a prompt as part of the voicemail. In another aspect, the system can collect text incrementally with repeated voicemails from the same caller left on the verification system 206. The verification system would be trained typically in the background as soon as the textile data is available.

In another aspect, any data storage which allows mapping between ANI, name and email address would be applicable for the present disclosure. Data can be stored on premises or in the cloud and reachable through any kind of interface.

In a multitenant cloud environment, the verification service 206 can be extended to be multitenant by introducing a dedicated verification telephone number for every tenant and by isolating and optionally encrypting the tenant-specific ANI-name-email directory. The ANI of any incoming calls into the number can be checked against the tenant-specific directory in order to identify and reject unknown callers.

In yet another aspect, translation services can be part of the verification system 206 as well. The system may have stored in the user profile or upon request of a preferred target language of the person being called. That data can be accessed or stored in a directory next to the ANI-name-email data and easily accessed for translation of the message into a different target language.

In yet another aspect of this disclosure, the concepts disclosed herein can be expanded to encompass other scenarios such as livestreaming data, video streaming, video conferences, text sessions, and so forth. For example, fraudsters might leave fraudulent voicemails but could also provide fraudulent video or a fraudulent livestream in which they are impersonating another individual. In such a scenario, the audio of a livestream or a video could be used in order to confirm based on reference to a voiceprint that the person in the livestream or video is who they claim to be. Additionally, in such a scenario, a videoprint could also be stored in a similar way to the voiceprint described above. In the livestream or a video scenario, the system could also compare the image or video data of an individual speaking to store its data to confirm the identity of the individual in the video.

In this scenario, the system could also include a timing element as the livestream is more synchronized with real time use when compared with the voicemail message which enables time to perform a transcription and analysis of the voicemail. In a video scenario, the system could begin a livestream between a first person who claims to be John and the second person. The issue would be whether the first person is actually John as he claims to be. The modification of the approach in this scenario could include the beginning of receiving one or more of audio data spoken by "John" and a video data of "John". Knowing that the interaction is live, the system could dedicate compute resources to evaluating one or more of the audio and the video to confirm the identity of "John." The system could expand into the cloud of networked computing systems to reach out and provision quickly additional compute resources to quickly perform an analysis to confirm the identity of the first person in the livestream.

If the first person and the second person are in a livestream speaking with each other, it may not be convenient for the second person to check an email in the middle of this communication to confirm whether the first person is actually John. Thus, an alternate scenario, the system would present on the video screen of the second person data similar to that shown in FIG. 5 or FIG. 6 in which they could be easily notified regarding whether there is a match or a mismatch with respect to the identity of the first person in the video conference. It would be assumed in the case of a proper match that the second person wants to continue the discussion with John. However, in the case where there is not a match or there is a mismatch, which brings into question the identity of the first person, the second person may be presented with alternative such as to discontinue the conversation, implement what appears to be a loss of the communication channel to the first person which can hide the impression that the second person is just dropping the communication. Other alternative approaches could be used as well. Of course, the approach described above can also be applied in which a text or an email is sent to the second person with the notification to the recipient of whether the user can be trusted.

Figure 7:
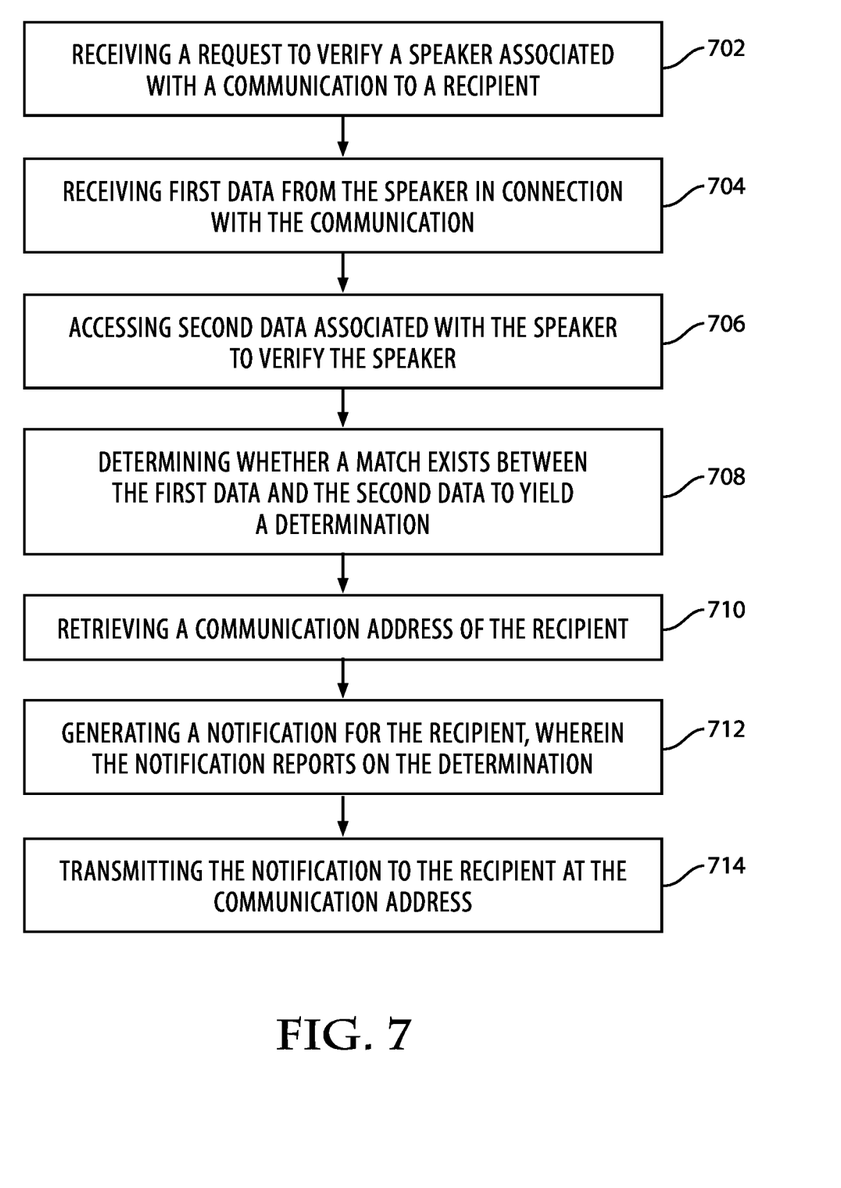
FIG. 7 illustrates process flow of a call.

FIG. 7 illustrates an example method related to this disclosure. It is noted that the method in this scenario is described as being performed by the verification system 206. However, the steps described herein and claims can be directed to any of the components or any group of components disclosed for example in FIGS. 2 and 3. For example, claims can be directed to the steps performed by the voicemail system 204 as well as verification system 206. Claims can be directed at any component disclosed herein.

An example method includes receiving a request to verify a speaker associated with a communication to a recipient (702), receiving first data from the speaker in connection with the communication (704), accessing second data associated with the speaker to verify the speaker (706), determining whether a match exists between the first data and the second data to yield a determination (708), retrieving a communication address of the recipient (710), generating a notification for the recipient, wherein the notification reports on the determination (710) and transmitting the notification to the recipient at the communication address (712).

The communication can include one of a voicemail, a livestream of data, a video communication, a text communication or any combination of one or more modalities. The communication address can include one or more of an IP address, and email address, a phone number, a physical address, and a conference bridge. Generally speaking, the communication address is an identifier of the device or application associated with an individual or entity. Individuals can be either party associated with the communication. The notification can include one or more of an object presented on a video screen of the recipient, an email, a text message, a haptic object, an audio message, a video message, and a multi-modal message. The object presented on a video screen can be an overlay graphic which presents information to the user or may be integrated into the video in some manner. The notification can be configured with an address associated with the speaker. The address associated with the speaker can also include an IP address, and email address, a phone number, or any other data which identifies the speaker. When the notification is configured with an address associated with the speaker, the notice can appear to the recipient as though it was sent by the speaker. In this regard, implementing this approach can enable a simplified mechanism for the recipient to be able to easily email or respond to the speaker. The speaker does not have to personally generate an email or the notification but can receive a responsive email from the recipient as though they had. The notification can include a link to data associated with the communication.

In one aspect, when the communication is live between the speaker and the recipient, the method can include one or more of accessing expanded compute resources to determine whether the match exists between the first data and the second data, retrieve the communication address of the recipient and generate the notification for the recipient.

In another aspect, the need to confirm the identity of a person can apply to the recipient of a communication. Thus, the processes described above can also apply to the recipient, wherein the recipient needs to be enrolled or confirmed for the initiator of the communication. The initiator of the communication can then receive a confirmation that the recipient is who they claim to be. The system might also withhold providing the communication to the recipient until the recipient identity is confirmed by the speaker.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc., that perform particular tasks or implement particular abstract data types. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to any data processing system that utilizes parameters for evaluating data input to generate output. While typical ASR magic tuning parameters are the example mainly discussed above, the disclosure covers other concepts as well, especially those that the future ASR technique might develop. The disclosure also covers any audio labelling task like natural language understanding (directly) on audio. In another aspect, the disclosure extends beyond automatic speech recognition and audio labeling to any other machine learning task which requires tuning system parameters on development sets. In this regards, automatic speech recognition would just be an example task.

Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
    receiving a request to verify a voice message from a person impersonating a speaker using a voiceprint associated with the speaker;
    determining that audio of the voice message does not match the voiceprint;
    generating a notification that indicates the voice message was not successfully verified; and
    transmitting an email or text message to a recipient device of a called party, the email or text message including the notification and a link to report the voice message to the authorities.

2. The method of claim 1, further comprising:
    transcribing the voice message to yield a transcription; and
    transmitting the transcription to the recipient device.

3. The method of claim 1, wherein the notification is separate and distinct from the link to report the voice message to the authorities.

4. The method of claim 1, wherein the email or text message further includes data about the person impersonating the speaker.

5. The method of claim 1, wherein the email or text message includes an additional link to block further communication from the person impersonating the speaker.

6. The method of claim 1, wherein the voiceprint is generated directly from a different voice message than the voice message received from the speaker, and wherein a length of the voice message being verified is insufficient to generate an independent voiceprint.

7. A system comprising:
    a processor; and
    a computer-readable storage medium storing programming instructions that, when executed by the processor, cause the processor to:
        receive a request to verify a voice message from a person impersonating a speaker using a voiceprint associated with the speaker;
        determine that audio of the voice message does not match the voiceprint;
        generate a notification that indicates the voice message was not successfully verified; and
        transmit an email or text message to a recipient device of a called party, the email or text message including the notification and a link to report the voice message to the authorities.

8. The system of claim 7, wherein the notification is separate and distinct from the link to report the voice message to the authorities.

9. The system of claim 7, wherein the email or text message further includes data about the person impersonating the speaker.

10. The system of claim 7, wherein the email or text message includes an additional link to block further communication from the person impersonating the speaker.

11. The system of claim 7, wherein the programming instructions further cause the processor to:
    transcribe the voice message to yield a transcription; and
    transmit the transcription to the recipient device.

12. The system of claim 7, wherein the voiceprint is generated directly from a different voice message than the voice message received from the speaker, and wherein a length of the voice message being verified is insufficient to generate an independent voiceprint.

13. A computer-readable storage device storing programming instructions that, when executed by a processor, cause the processor to:
    receive a request to verify a voice message from a person impersonating a speaker using a voiceprint associated with the speaker;
    determine that audio of the voice message does not match the voiceprint;
    generate a notification that indicates the voice message was not successfully verified; and
    transmit an email or text message to a recipient device of a called party, the email or text message including the notification and a link to report the voice message to the authorities.

14. The computer-readable storage device of claim 13, wherein the notification is separate and distinct from the link to report the voice message to the authorities.

15. The computer-readable storage device of claim 13, wherein the email or text message further includes data about the person impersonating the speaker.

16. The computer-readable storage device of claim 13, wherein the email or text message includes an additional link to block further communication from the person impersonating the speaker.

17. The computer-readable storage device of claim 13, wherein the programming instructions further cause the processor to:
    transcribe the voice message to yield a transcription; and
    transmit the transcription to the recipient device.

18. The computer-readable storage device of claim 13, wherein the voiceprint is generated directly from a different voice message than the voice message received from the speaker, and wherein a length of the voice message being verified is insufficient to generate an independent voiceprint.

* * * * *